(12) United States Patent
Kim et al.

(10) Patent No.: US 8,518,178 B2
(45) Date of Patent: Aug. 27, 2013

(54) SILICON CARBIDE NANOFIBER AND FABRICATION METHOD OF SILICON CARBIDE NANOFIBER USING EMULSION SPINNING

(75) Inventors: Il Doo Kim, Seoul (KR); Seung Hun Choi, Seoul (KR); Seong Mu Jo, Seoul (KR); Jae-Min Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 250 days.

(21) Appl. No.: 13/012,440

(22) Filed: Jan. 24, 2011

(65) Prior Publication Data

US 2011/0274906 A1   Nov. 10, 2011

(30) Foreign Application Priority Data

May 4, 2010   (KR) ........................ 10-2010-0041958

(51) Int. Cl.
*C30B 29/20*   (2006.01)

(52) U.S. Cl.
USPC ................... 117/68; 117/70; 117/78; 117/79; 264/172.11

(58) Field of Classification Search
USPC ...................... 117/68, 70, 79, 78; 264/172.11
See application file for complete search history.

(56) References Cited

U.S. PATENT DOCUMENTS

| | | | |
|---|---|---|---|
| 7,910,082 B2 * | 3/2011 | Dawes et al. | 423/346 |
| 2004/0245910 A1 * | 12/2004 | Tang et al. | 313/483 |
| 2004/0245911 A1 * | 12/2004 | Tang et al. | 313/483 |

OTHER PUBLICATIONS

W.M. Qiao, et al; "Synthesis of crystalline SiC nanofiber through the pyrolysis of polycarbomethylsilane coated platelet carbon nanofiber", Applied Surface Science; vol. 253, Issue 10, Mar. 15, 2007; pp. 4467-4471.

* cited by examiner

*Primary Examiner* — Bob M Kunemund
(74) *Attorney, Agent, or Firm* — Ladas & Parry LLP

(57) ABSTRACT

Disclosed is: a single crystalline silicon carbide nanofiber having improved thermal and mechanical stability as well as a large specific surface area which is applicable to a system for purifying exhaust gas, silicon carbide fiber filter, diesel particulate filter having a high temperature stability and may be used in the form of nanostructures such as nanorods and nanoparticles.

11 Claims, 13 Drawing Sheets

SILICON CARBIDE NANOFIBER AND FABRICATION METHOD OF SILICON CARBIDE NANOFIBER USING EMULSION SPINNING

FIELD OF THE INVENTION

The present invention relates to a silicon carbide nanofiber having excellent thermal and mechanical stability with a large specific surface area, and a preparation method thereof using an emulsion spinning.

BACKGROUND OF THE INVENTION

Silicon carbide (SiC) is a chemically stable ceramic material that is widely used in applications requiring high mechanical endurance and high thermal stability.

The SiC has various crystal structures such as cubic, hexagonal, and rhombohedral systems, among which, extensive studies on the cubic SiC have been conducted because the cubic SiC can be prepared easily and economically. In particular, the one-dimensional (1D) cubic SiC is useful for preparing a diesel particulate filter or a ceramic fiber filter having high tensile strength because the 1D cubic SiC has a large specific surface area and high surface-to-volume ratio with a porous structure.

Various methods for preparing the 1D cubic SiC structure have been developed. Examples for the method include chemical vapor deposition (G. Y. Li et. al., J. Phys. Chem. C, 2009, 113, 17655), carbothermal reduction (B-H. Yoon et. al., J. Am. Ceram. Soc., 2007, 90, 3759), and template synthesis (H. Cui et. al., Chem. Comm., 2009, 6243). However, these methods have many difficult problems, e.g., low reproducibility and difficulty in application for a large scale processing. Further, the template synthesis method is complicated because a subsequent chemical process for removing the template must be conducted.

Recently, there has been introduced a method for preparing SiC fibers which comprises the step of electrospinning an SiC precursor, a commercially available polycarbosilane so as to resolve the above-mentioned problems and to obtain a microscale SiC fiber in large quantities. However, this method has a difficulty in preparing a nano-scale SiC fiber in a high purity because the polycarbosilane must be used in a high concentration of 50% by weight or more due to its low molecular weight.

Accordingly, there has been a need for developing a novel method for preparing a single crystalline SiC nanofiber having excellent thermal and mechanical stability with a large specific surface area.

SUMMARY OF THE INVENTION

Accordingly, it is an object of the present invention to provide a composite nanofiber which is useful in preparing a single crystalline SiC nanofiber having excellent thermal and mechanical stability with a large specific surface area.

It is another object of the present invention to provide single crystalline SiC nanofibers which are prepared by using the composite nanofibers, and a preparation method thereof.

It is a further object of the present invention to provide an SiC nanofiber web comprising a well connected network of the single crystalline SiC nanofibers, and an SiC fiber filter comprising the same.

It is still further object of the present invention to provide an SiC nanostructure which is prepared by grinding the single crystalline SiC nanofibers.

In accordance with one aspect of the present invention, there is provided composite nanofibers comprising an aqueous polymer matrix and at least one SiC precursor structures dispersed in the aqueous polymer matrix.

In accordance with another aspect of the present invention, there is provided single crystalline SiC nanofibers which are fabricated by thermally treating the composite nanofibers and has a diameter ranging from 30 nm to 1000 nm, an aspect ratio of 10 or more and a specific surface area of 10 $m^2/g$ or more.

In accordance with a further aspect of the present invention, there is provided a method for preparing the single crystalline SiC nanofibers, comprising the steps of:

preparing an oil in water (O/W) emulsion by mixing an SiC precursor solution in a non-polar solvent with a surfactant, a polar solvent, and an aqueous polymer;

subjecting the O/W emulsion to spinning to prepare composite nanofibers which comprises an aqueous polymer matrix and at least one silicon carbide precursor structure dispersed in the aqueous polymer matrix; and thermally treating the composite nanofibers.

In accordance with still further aspect of the present invention, there is provided an SiC nanofiber web comprising a well connected network of the single crystalline SiC nanofibers.

In accordance with still further aspect of the present invention, there is provided an SiC fiber filter comprising the SiC nanofiber web.

In accordance with still further aspect of the present invention, there is provided an SiC nanostructure which is prepared by grinding the single crystalline SiC nanofibers.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Hereinafter, a detailed description of the present invention is given so as to make it possible to easily conduct the present invention with referring the accompanying drawings. But the present invention may be modified variously and the following description is not intended to limit the scope of the invention.

Further, all terms used herein which include engineering or scientific terms have same meanings as those well-known to an ordinary skilled person in the art. The terms defined in a conventional dictionary further encompass the meanings described in related references and the present specification and the technical terms used herein are merely illustrative for specific examples and are not intended to limit the scope of the invention. As used herein, an element or step recited in the singular and proceeded with "a" or "an" should be understood as not excluding plural said elements or steps, unless such exclusion is explicitly recited.

As used herein, the term "comprising" embodies a specific property, scope, integer, step, behavior, element and/or component and is not intended to exclude the existence or addition of the other property, scope, integer, step, behavior, element and/or component.

As used herein, the term "nano" refers to a nano-scale size which is ranging from 1 μm or less.

As used herein, the term "diameter" refers to the length of the minor axis through the center of the fiber.

As used herein, the term "aspect ratio" refers to the ratio of the length of the major axis to the length of the minor axis in which both of the major axis and minor axis go through the center of the fiber.

The present invention is characterized in fabricating single crystalline SiC nanofibers by using composite nanofibers which are prepared by spinning an O/W emulsion wherein the composite nanofibers comprises an aqueous polymer matrix and at least one silicon carbide precursor structure dispersed in the aqueous polymer matrix.

Hereinafter, the individual steps of the preparation method of SiC nanofibers according to the present invention will be explained in detail.

Figure 1:
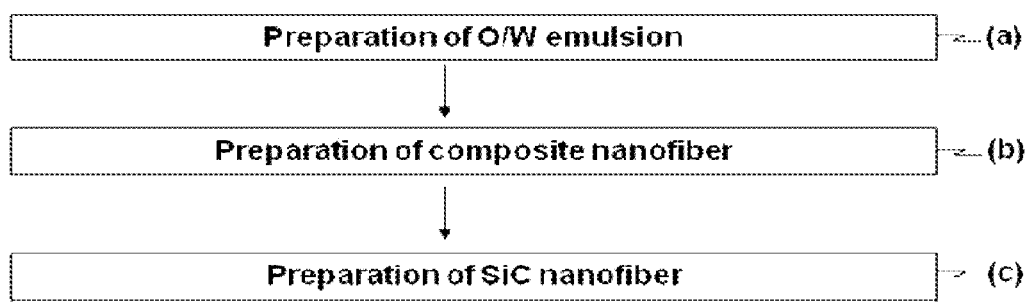
FIG. 1: a flow chart for preparing SiC nanofibers according to the present invention.

FIG. 1 is a flow chart of the preparation method of the inventive SiC nanofibers. The flow chart is merely illustrative of the method by which the SiC nanofibers of the invention may be prepared and are not intended to limit the scope of the invention as illustrated in FIG. 1. Accordingly, various modifications may be made to the method for preparing the SiC nanofibers.

As shown in FIG. 1, the method of the present invention comprises the following steps of: (a) preparing an O/W emulsion; (b) preparing a composite nanofiber by spinning the O/W emulsion; and (c) preparing an SiC nanofiber by thermal treatment of the composite nanofibers. The method may further comprise any other processes for forming SiC nanofibers.

Step (a)

In this step, an SiC precursor solution which is prepared by dissolving the SiC precursor in a non-polar solvent is mixed with a surfactant, a polar solvent, and an aqueous polymer to prepare an oil in water (O/W) emulsion. The procedure and method for mixing the SiC precursor with surfactant, polar solvent, and aqueous polymer are not limited. For example, the O/W emulsion may be prepared by a method comprising: dissolving a surfactant in a polar solvent, mixing the resulting solution with an SiC precursor-containing solution, and treating the resulting mixture with the surfactant; or a method comprising: dissolving an aqueous polymer in a polar solvent, mixing the resulting solution with an SiC precursor-containing solution, and treating the resulting mixture with a surfactant. Hereinafter, the former preparation method of an O/W emulsion will be explained in detail.

First, an SiC precursor is dissolved in a non-polar solvent to prepare SiC precursor-containing solution.

The SiC precursor forms structures having spherical, elliptical or cylindrical shape which are irregularly dispersed in the aqueous polymer of the spun composite nanofibers and then converts to SiC nanofibers by subsequent thermal treatment.

Examples for the SiC precursor include polycarbosilane (PCS), polycarbomethylsilane, polysilazane, polysilane, organopolysiloxane, and a mixture thereof. There is no limit to the molecular weight of the SiC precursor.

The SiC precursor is used in an amount of 50 to 200 weight part based on 100 weight part of the SiC precursor-containing solution. When the amount of the used SiC precursor is over 200 weight part or less than 50 weight part, it is difficult to form a fibrous SiC.

The non-polar solvent usable in the present invention is an oil based solvent which does not have miscibility with a polar or aqueous solvent and does not dissolve the aqueous polymer. Examples for the non-polar solvent include toluene, benzene, hexane, pentane, chloroform, and a mixture thereof.

Separately, a surfactant-containing solution is prepared by dissolving the surfactant in a polar solvent.

The surfactant lowers the surface tension or surface energy of the interface between immiscible liquids to form micelles, and makes the micelles of the SiC precursor solution stable, as a first dispersion stabilizer.

There is no specific limitation of the surfactant usable in the present invention as long as micelles of the SiC precursor solution can be formed in a polar or non-polar solvent. Examples for the surfactants include anionic surfactants such as linear alkylbenzene sulfonate, alpha olefin sulfonate, alkyl ester sulfate, polyoxyethylene alkyl ester sulfate, sodium alkylsulfate, calcium alkylsulfate, and alkylbenzene calcium sulfonate; cationic surfactants such as dialkyl dimethylammnonium salt, imidazolium salt, alkyldimethylbenzylammonium salt, and alkylmethylammonium bromide; nonionic surfactants such as polyoxyethylene alkylether, alkyldimethylamine oxide, fatty acid alkanolamide, alkylpolyglucoside, and polyoxyethylenealkylphenylether; ampholytic surfactants such as alkylbetaine and alkylsulfobetaine; and a mixture thereof.

The surfactant makes the SiC precursor solution to disperse stably in the polar solvent in the form of micelle having a diameter ranging from several 50 nm to micrometers. Accordingly, the concentration of the surfactant depends on the amount of the SiC precursor solution. The surfactant is used in an amount of 5 to 50% by weight, preferably 10 to 50% by weight based on the aqueous polymer. When the amount of the surfactant is over 50% by weight or less than 5% by weight, it is difficult to form micelles and the viscosity of the obtained emulsion is not sufficient.

The polar solvent usable in the present invention is a solvent which does not form a homogeneous mixture with the SiC precursor solution but can dissolve the aqueous polymer. Examples for the polar solvent include water, ethanol, dimethylformamide (DMF), N-methylpyrrolidone (NMP), dimethylacetamide (DMAc), and a mixture thereof.

The SiC precursor-containing solution is dispersed in the surfactant-containing solution. As a result, the SiC precursor solution is dispersed in the aqueous polymer-containing solution in the form of micelles encased by the surfactant, which has a diameter ranging from 50 nm to several micrometer.

To enhance the dispersion degree of the micelles, a sonication (homogenization) process may be further conducted for 30 min to 120 min.

The formed micelle has a diameter of 50 nm to 10 μm, preferably 100 nm to 5 μm. When the diameter of the formed micelle is less than 50 nm or over 10 μm, the stability of the O/W emulsion may be decreased.

The diameter of the SiC fiber depends on the amount of the SiC precursor-containing solution. Accordingly, the SiC precursor-containing solution is used in an amount of 10 to 50% by weight, preferably 10 to 40% by weight, more preferably 10 to 30% by weight based on the total amount of the surfactant, polar solvent and aqueous polymer. When the amount of the SiC precursor-containing solution is less than 10% by weight, it is hard to form a continuous SiC fiber due to lack of the SiC precursor, while when the amount of the SiC precursor-containing solution is over 50% by weight, the composite nanofiber is not formed easily.

Then, an O/W emulsion is prepared by dissolving an aqueous polymer which is soluble in the polar solvent, into the resulting dispersion.

The aqueous polymer increases the viscosity of the O/W emulsion enough for spinning and makes micelles to disperse stably and homogeneously as a second dispersion stabilizer.

Preferably, the aqueous polymer is a thermoplastic or thermosetting polymer which does not have miscibility with the non-polar solvent while dissolves in a polar solvent. Examples for the aqueous polymer includes polyurethane; polyurethane copolymers such as polyether urethane; cellulose derivatives such as cellulose acetate, cellulose acetate propionate; other polymers such as polymethylmethacrylate (PMMA), polymethylacrylate (PMA), polyacryl copolymer, polyvinylacetate (PVAc), polyvinylacetate copolymer, polyvinylalcohol (PVA), polyfurfurylalcohol (PPFA), polyvinylpyrrolidone (PVP), polystyrene (PS), polystyrene copolymer, polyethylene oxide (PEO), polypropylene oxide (PPO), polyethylene oxide copolymer, polypropylene oxide copolymer, polycarbonate (PC), polyvinylchloride (PVC), polyca-prolactone, polyvinyl fluoride, polyvinylidene fluoride copolymer, polyamide, and polyether imide; or a mixture thereof.

The amount of the aqueous polymer is 8 to 20% by weight based on the polar solvent. When the amount of the aqueous polymer is less than 8% by weight or over 20% by weight, the viscosity of the solution is not high enough for spinning.

The SiC precursor, aqueous polymer, solvent, and surfactant can be obtained commercially or prepared by known methods.

The obtained O/W emulsion comprises the SiC precursor solution in the form of microscale micelles which are encased by the surfactant and dispersed in the aqueous polymer-containing solution.

Step (b)

In this step, the O/W emulsion obtained in step (a) is subjected to spinning.

Examples for the spinning method include electrospinning, flash spinning, and electrostatic melt-blowing. The spinning process is conducted in accordance with one of conventional methods well-known in the art.

For example, the electrospinning may be conducted by injecting the loaded O/W emulsion into a syringe pump at a constant rate. It is preferable that the available voltage is 10 kV or more and the injection rate is about 10 μm/min. During the electrospinning, the solvent is vaporized to generate a sol-gel reaction in the emulsion thereby polymer fibers are formed as a solid. Simultaneously, in the polymer fiber, the non-polar solvent is vaporized and SiC precursor solution-containing micelles are stretched in the form of spherical, elliptical or cylindrical shape. These micelles are tended to aggregate and separate gradually from the polymer fiber. As a result, the composite nanofiber is fabricated which comprises a fibrous aqueous polymer matrix and at least one SiC precursor structures dispersed in the aqueous polymer matrix.

The diameter of the SiC precursor structures depends on the concentration of the SiC precursor-containing solution. As the concentration increases, the diameter of the SiC precursor structures having an elliptical or cylindrical shape increases. Therefore, the amount of the SiC precursor-containing solution is 10 to 50% by weight, preferably 10 to 40% by weight based on the total amount of surfactant, polar solvent and aqueous polymer. When the amount of the used precursor is less than 10% by weight, it is hard to for a continuous SiC fiber, while when the amount of the droplets is over 50% by weight, the composite nanofiber is not formed.

The diameter of the SiC precursor structures is 30 nm to 1000 nm, preferably 100 nm to 800 nm. When the diameter is in the range, it is preferred to form continuous nanofibers.

The SiC precursor structure has a spherical, elliptical or cylindrical shape and the obtained composite nanofiber comprise the SiC precursor structures having various shapes.

Preferably, the SiC precursor structure has a shape selected from the group consisting of a spherical shape having an average diameter ranging from 20 nm to 50 nm; an elliptical shape having an aspect ratio of 1.1 to 5 and a minor axis length of 50 nm to 250 nm; and a cylindrical shape having an aspect ratio of 5 to 20 and a minor axis length of 50 nm to 500 nm.

Further, the diameter of the composite nanofiber including the diameter of SiC precursor structure is 100 nm to 1500 nm and an aspect ratio thereof is 10 or more, preferably 200 or more.

Step (c)

In this step, the thermal treatment of the composite nanofibers obtained in step (b) is conducted at a temperature of 80 to 2500° C. to enhance the density of the SiC precursor structures discontinuously dispersed in the composite nanofibers.

Specifically, the thermal treatment comprises a first thermal treating process (stabilization step) at 150 to 230° C. in the air or under an oxygen atmosphere, and a second thermal treating process at 1200 to 2500° C. in a vacuum or under an inert atmosphere. The first thermal treating process is a stabilization step which induces a cross linking reaction of the polymer with oxygen to maintain the shape of the composite nanofibers during subsequent second thermal treating process. The second thermal treating process is a formation step of SiC nanofibers in which the aqueous polymer is removed by thermal decomposition and the SiC nanofibers are formed by aggregation and crystallization of the SiC precursor structure in the aqueous polymer. Accordingly, when the thermal treatment temperature is too low, it may be hard to conduct the thermal decomposition of the aqueous polymer, as well as the aggregation and crystallization of the SiC precursor structure. When the thermal treatment temperature is too high, it is hard to maintain the shape of the fibers and undesired crystalline phase may be formed. Preferably, the second thermal treating process is conducted at a temperature of 1200 to 2000 under Ar or $N_2$ atmosphere for preventing the oxygen inflow during the thermal treatment.

In accordance with another embodiment of the present invention, an electron beam or ultraviolet ray radiation process may be conducted instead of the first thermal treating process.

As described in above, single crystalline SiC nanofibers can be fabricated by the thermal treatment of the SiC precursor structures aggregated in a high density.

The diameter of the SiC nanofiber may be determined by controlling the concentration of the SiC precursor-containing solution, surfactant, and aqueous polymer, spinning conditions, and thermal treating conditions, but there is no limitation to the diameter of the nanofiber as long as the spinning process can be conducted to form the nanofiber.

Figure 2:
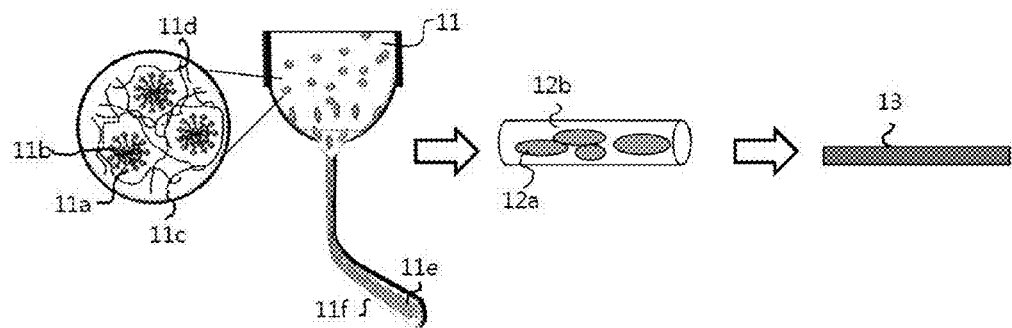
FIG. 2: a schematic processing procedure of SiC nanofibers according to the present invention.

FIG. 2 is a schematic processing procedure of SiC nanofibers using the electrospinning method. The processing procedure is merely illustrative of the invention and is not intended to limit the scope of the invention as illustrated in FIG. 2. Accordingly, various modifications may be made to the method for preparing the SiC nanofibers.

As shown in FIG. 2, the O/W emulsion (11) obtained in step (a) is loaded into a syringe pump and subjected to the electrospinning.

The loaded O/W emulsion (11) in the syringe pump comprises the SiC precursor-containing solution (11b) in the form of micelles encased by the surfactant (11a) and dispersed in a solution in which the aqueous polymer (11d) is dissolved in the polar solvent (11c).

By electrospinning of the O/W emulsion, the composite nanofibers are fabricated in which at least one SiC precursor structures (11e) dispersed in the fibrous aqueous polymer (11f). The SiC precursor structures have a spherical or elliptical shape, or a cylindrical shape as the SiC precursor is stretched.

In the obtained composite nanofiber, the fibrous aqueous polymer (12b) is pyrolyzed by a continuous thermal treating process and the SiC precursor structures (12a) are aggregated and crystallized into SiC, thereby SiC nanofibers (13) are formed.

The SiC nanofibers may be provided in the form of a web comprising a well connected network of the nanofibers.

While any microscale fibers can be fabricated by conventional methods, nanoscale fibers having high crystallizability and surface-to-volume ratio can be fabricated by the inventive method which comprises the steps of: preparing a composite nanofiber which comprises the fibrous aqueous polymer matrix and at least one SiC precursor structures dispersed in the aqueous polymer matrix, and subjecting the composite nanofiber to two consecutive thermal treatment steps to remove the aqueous polymer and to aggregate and crystallize the SiC precursor structures.

Specifically, the SiC nanofiber of the present invention is a single crystalline SiC nanofiber having a structure selected form the group consisting of cube, hexahedron, and rhombohedron; and its specific surface area is 10 $m^2/g$ or more, preferably 20 $m^2/g$ or more when measured by BET (Brunauer Emmett Teller) method.

Further, the diameter of the SiC nanofiber of the present invention is 1 μm or less, preferably 30 nm to 1000 nm, more preferably 30 nm to 800 nm. To enhance the specific surface area of the fibers and minimize the pore size between the fibers, the SiC nanofiber has a diameter of 400 nm or less, most preferably 100 to 350 nm. The SiC nanofiber preferably has an aspect ratio of 10 or more, preferably 200 or more.

The SiC nanofibers of the present invention have an improved thermal and mechanical stability as well as a large specific surface area, which is applicable to a system for purifying exhaust gas, SiC fiber filter, diesel particulate filter which require the high temperature stability. The SiC nanofibers may be used in the form of nanostructures such as nanorods and nanoparticles.

Accordingly, the present invention provides single crystalline SiC nanofibers, an SiC nanofiber web comprising a well connected network of the SiC nanofibers, an SiC fiber filter comprising the SiC nanoweb, and SiC nanostructures in the forms of nanorods or nanoparticles which are prepared by grinding the SiC nanofibers.

The fibers which form the web have a diameter of 1 μm or less, preferably 400 nm or less, to increase the specific surface area and to form fine pores between the fibers.

The present invention further provides a composite nanofiber comprising an aqueous polymer matrix and at least one SiC precursor structure dispersed in the aqueous polymer matrix.

The following Preparation Examples and Examples are intended to further illustrate the present invention without limiting its scope.

Example 1

Fabrication of SiC Nanofiber 6 g of polycarbosilane (PCS, $M_w$: 800 g/mol) was completely dissolved in 4.6 ml of toluene (non-polar solvent). The resulting solution was added to an aqueous solution which is prepared by dissolving 0.072 g of sodium dodecylsulfate (SDS; anionic surfactant) into 5 ml of water (polar solvent). The resulting mixture was stirred at room temperature for 10 min and subjected to sonication for 2 hour. The mixture thus obtained was mixed with 0.75 g of polyvinylpyrrolidone (PVP, Mw: 1,300,000 g/mol) to obtain an O/W emulsion which comprises PCS-toluene micelles in an amount of 10% by weight based on the total amount of surfactant, polar solvent, and aqueous polymer.

Figure 3:
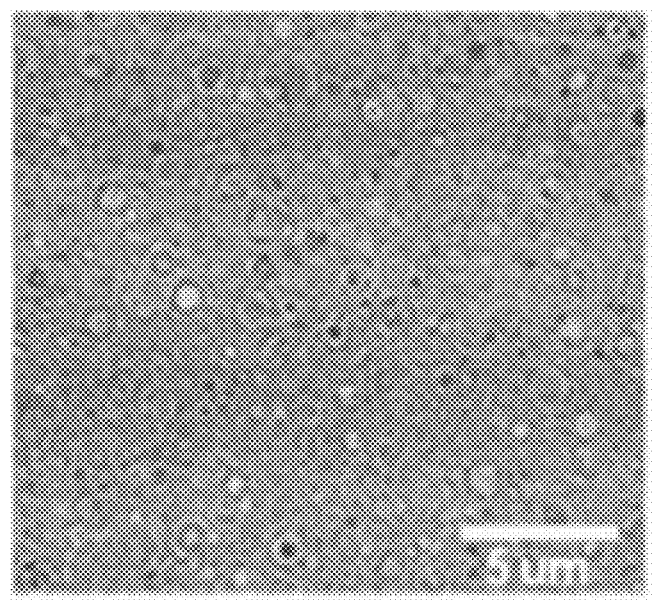
FIG. 3: a confocal microscopy image of the O/W emulsion prepared in Example 1.

The obtained O/W emulsion was observed by a confocal microscope and the result was shown in FIG. 3. As shown in FIG. 3, the SiC precursor micelles having a diameter of 50 nm to 1100 nm were dispersed in the aqueous polymer-containing solution to form an emulsion. Further, the emulsion showed superior dispersion stability even after 15 days.

Then, the obtained O/W emulsion in an amount of 20 ml was loaded into a syringe pump and subjected to an electrospinning at a rate of 10 μl/min (humidity: 30%, voltage: 20.0 kV, temperature: 30° C.) to prepare composite nanofibers.

Figure 4:
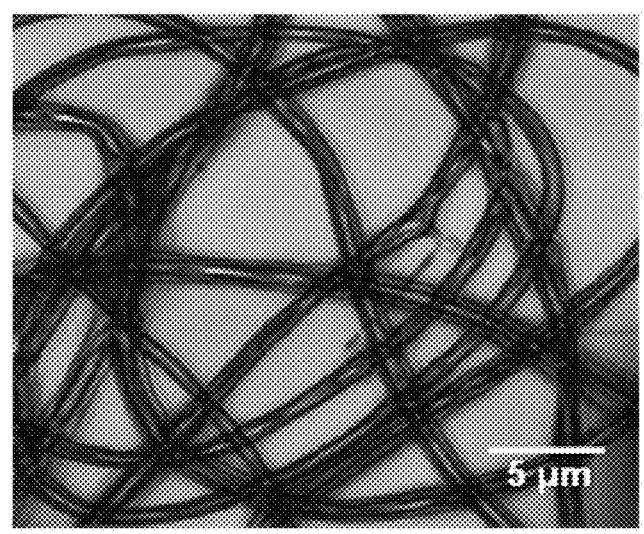
FIG. 4: a confocal microscopy image of the electrospun composite nanofibers in Example 1.

The obtained composite nanofibers were observed by a confocal microscope and the result was shown in FIG. 4. As shown in FIG. 4, the composite nanofibers have a structure in which several polycarbosilane structures are dispersed in the fibrous polyvinylpyrrolidone. Such structural characteristic of the composite nanofibers results from the sol-gel reaction and the evaporation of water accompanied by the electrospinning of the O/W emulsion which induces the formation of the fibrous polypyrrolidone and the elongation of the polycarbosilane micelles in the form of ellipsoid along with the evaporation of toluene to facilitate the separation from the fibrous polypyrrolidone.

Figure 5:
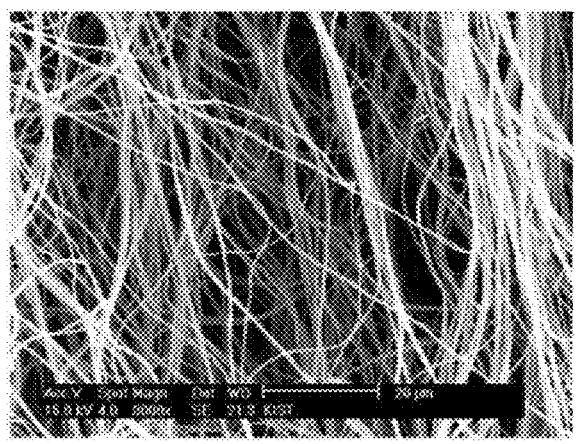
FIG. 5: a scanning electron microscopy (SEM) image of the electrospun composite nanofibers in Example 1.

The obtained composite nanofibers were observed by scanning electron microscope and the result was shown in FIG. 5. As shown in FIG. 5, the diameter of the composite nanofibers was ranging from 450 nm to 810 nm.

Figure 6:
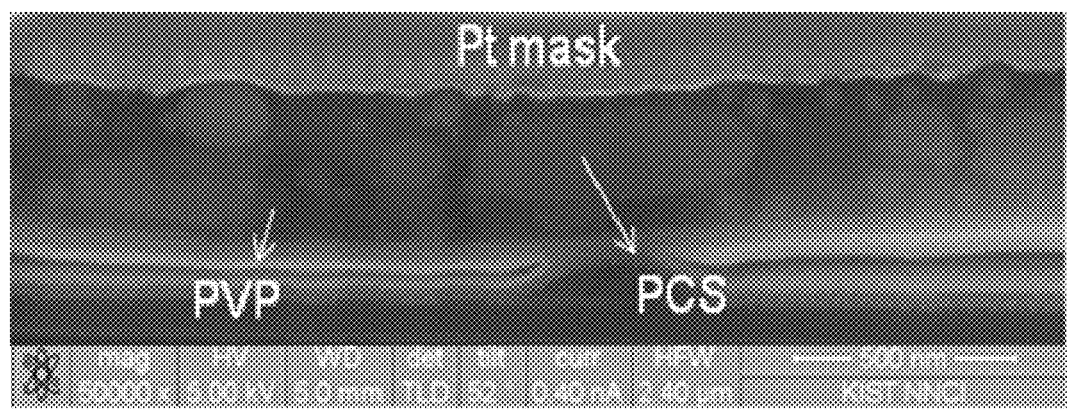
FIG. 6: a SEM image of the section of the electrospun composite nanofiber which is trimmed longitudinally by a focused ion beam (FIB) in Example 1.

The obtained composite nanofiber was trimmed longitudinally using a focused ion beam and the trimmed section was observed by SEM. The result was shown in FIG. 6. In FIG. 6, the bright part corresponds to polycarbosilane (PCS) and the dark part corresponds to polyvinylpyrrolidone (PVP). As shown in FIG. 6, the elongated elliptical shape-PCS structures having various sizes exist in an isolated state in the PVP fiber.

Next, the obtained composite nanofibers were subjected to a first thermal treatment at 200° C. in the air for 10 hour followed by a second thermal treatment at 1600° C. under argon atmosphere for 6 hour to form SiC nanofibers.

Figure 7:
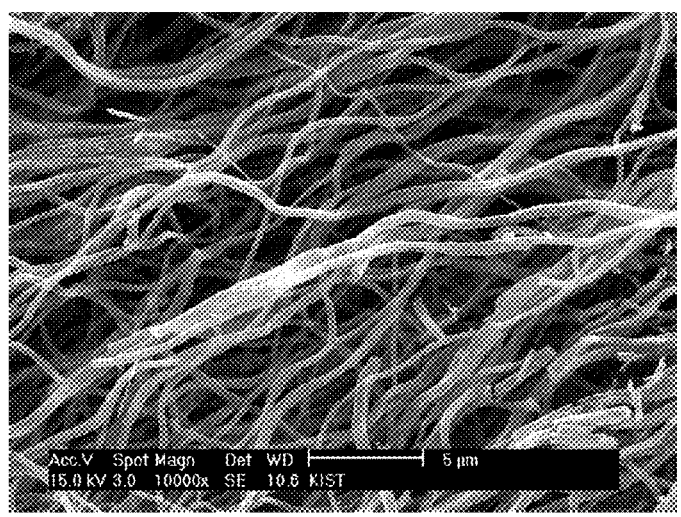
FIG. 7: a SEM image of the fibers obtained by the first thermal treatment of the composite nanofibers in Example 1.

The fibers obtained by the first thermal treatment were observed by SEM and the result was shown in FIG. 7. As shown in FIG. 7, the surface morphology of the fibers subjected to the first thermal treatment was not changed and the diameter ranging from 450 to 810 nm was maintained.

Figure 8:
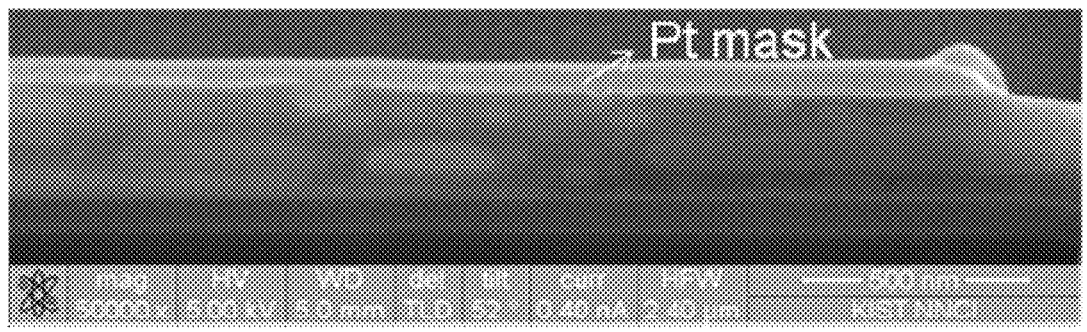
FIG. 8: a SEM image of the section of the fiber which is trimmed longitudinally by FIB after the first thermal treatment of the composite nanofibers in Example 1.

The fibers after the first thermal treatment were trimmed longitudinally by FIB and the trimmed section was observed by SEM. The result was shown in FIG. 8. In FIG. 8, a bright part corresponds to polycarbosilane (PCS) and the dark part corresponds to polyvinylpyrrolidone (PVP). As shown in FIG. 8, the elongated elliptical shape-PCS structures having various sizes exist in an isolated state in the PVP fiber after first thermal treatment.

Figure 9:
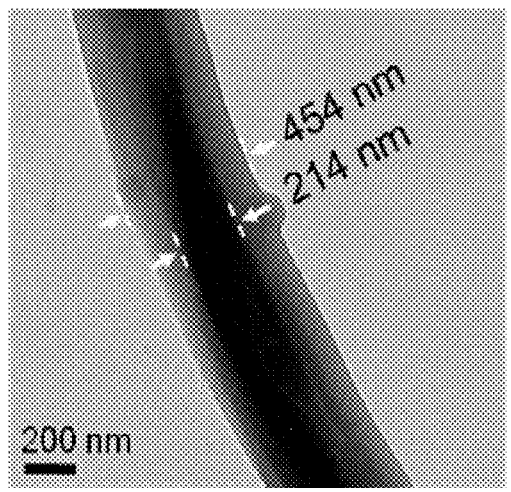
FIG. 9: a transmission electron microscopy (TEM) image of the fiber obtained by the first thermal treatment of the composite nanofiber in Example 1.

The fibers obtained after the first thermal treatment were observed using TEM and the result was shown in FIG. 9. In FIG. 9, the bright part corresponds to PVP fiber and the dark part corresponds to SiC precursor structures. TEM shows the phase contrast by the difference of electron beam penetration, and therefore the dark part in FIG. 9 means the overlapped PCS structures in the center of the fiber, not an aggregation of PCS structures. As shown in FIG. 9, the obtained fiber after first thermal treatment has a core-shell structure in which the core is composed of the PCS structures and the shell encasing the core is composed of PVP. The diameter of the PCS structures was 214 nm and the diameter of the fiber including the PVP polymer shell was 454 nm.

Figure 10:
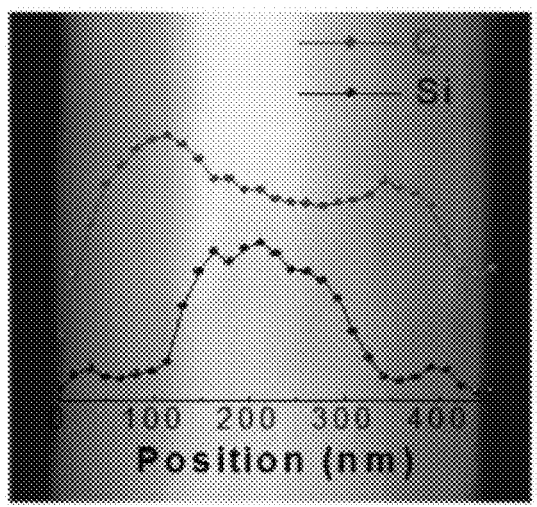
FIG. 10: a scanning transmission electron microscopy image of the fiber obtained by the first thermal treatment of the composite nanofiber in Example 1 and an energy dispersive spectroscopy (EDS) line profiles thereof.

The fiber obtained after first thermal treatment was further observed with scanning TEM and the scanning TEM image was shown in FIG. 10 with the EDS line profiles thereof. In FIG. 10, the bright part corresponds to PCS structures and the dark part corresponds to PVP fiber. As shown in FIG. 10, the shell is mostly made of carbon (C) and comprises little silicon (Si), while the core comprising the gathered PCS structures is mostly made of silicon.

Figure 11:
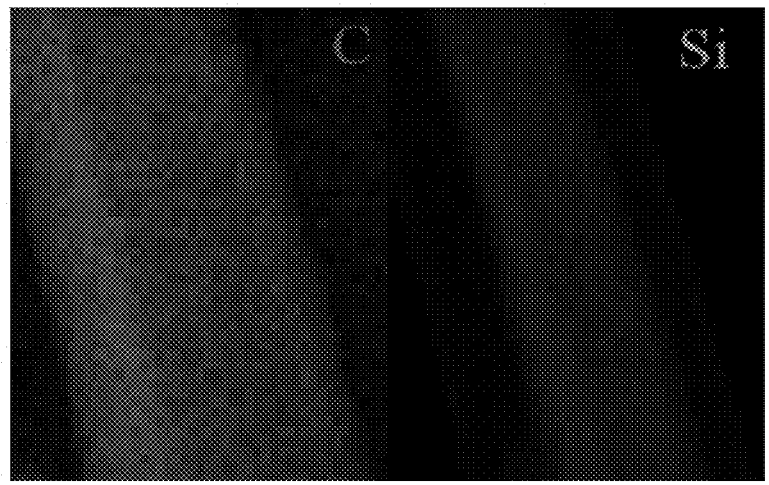
FIG. 11: a EDS mapping of element content of the area corresponding to FIG. 10.

An EDS mapping of the element content of the corresponding area in FIG. 10 was conducted and the result was shown in FIG. 11. In FIG. 11, the bright dots in the left image mean that carbon is uniformly located all over the fiber and the bright dots in the right image mean that silicon is located in the center of the fiber. This result shows that the fiber has a core-shell structure in which the core is made of the silicon-containing polycarbosilane structures and the shell is made of PVP.

Figure 12:
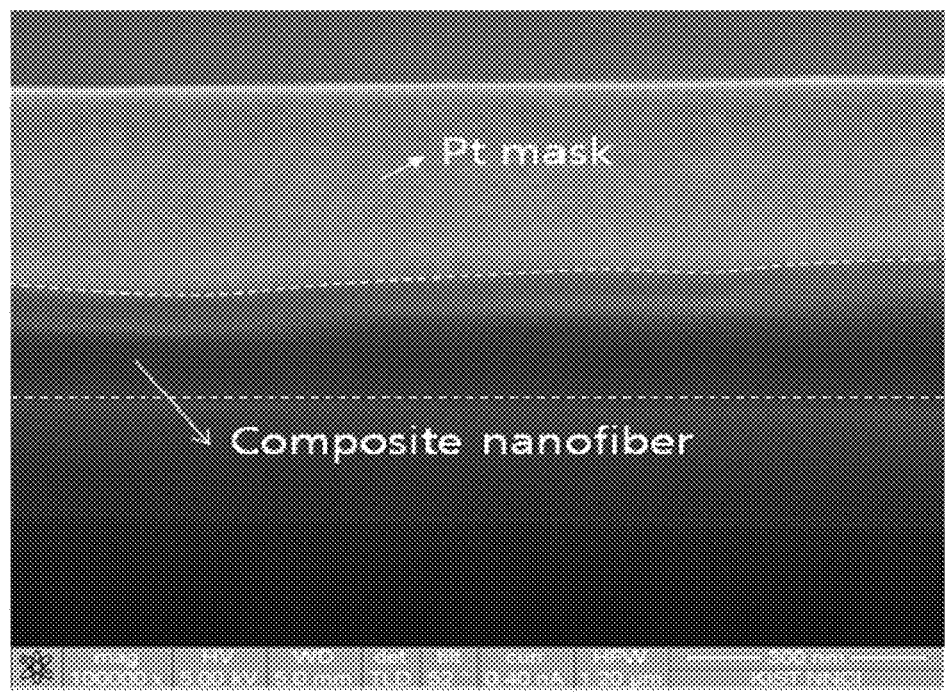
FIG. 12: a SEM image of the FIB trimmed section of the longitudinal nanofiber obtained at 300° C. during the second thermal treatment in Example 1.

During the second thermal treatment, the first thermal treated nanofiber was thermal treated at 300° C. and then, trimmed longitudinally by FIB. The cross section of the fiber was observed by SEM and the result was shown in FIG. 12. As shown in FIG. 12, the elliptical PCS structures which discontinuously dispersed in the first thermal treated fiber were aggregated during the second thermal treatment to form a continuous shape in the fibrous PVP. This result shows that the discontinuous PCS structures in elliptical or cylindrical shape in the first thermal treated fiber combined together during the second thermal treatment at about 300° C. to form a continuous core. The resulting SiC nanofiber by the second thermal treatment was observed by SEM and the result was shown in FIG. 13.

Figure 13:
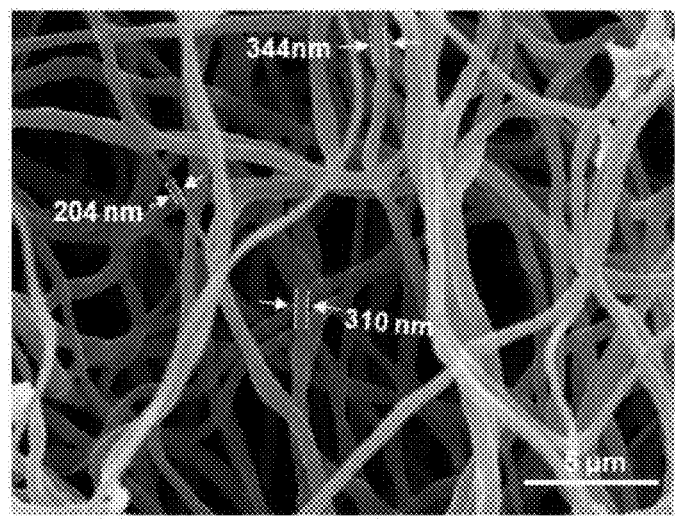
FIG. 13: a SEM image of the SiC nanofibers fabricated in Example 1.

As shown in FIG. 13, the SiC nanofiber had a diameter ranging from 200 nm to 350 nm which was smaller than that of the composite nanofiber. Such a decrease of the diameter resulted from the thermal decomposition of the polymer shell, and the aggregation and crystallization of the SiC precursor structures.

Figure 14:
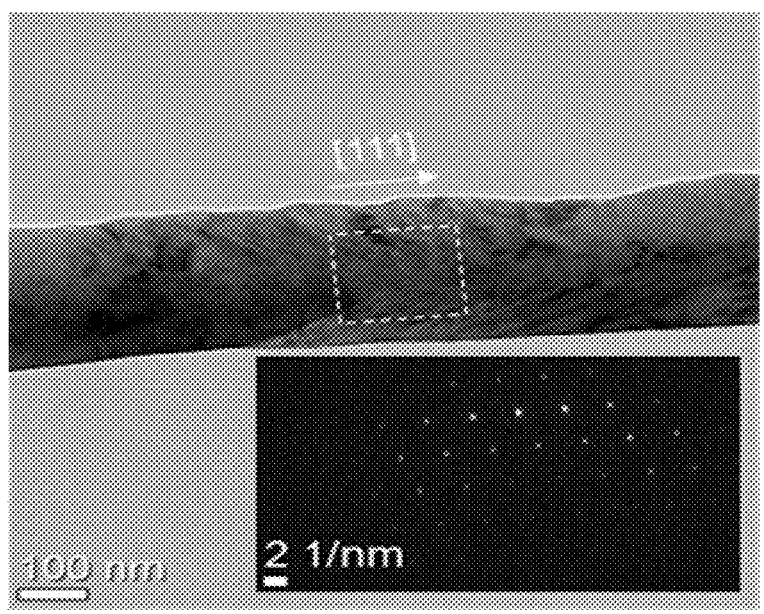
FIG. 14: a low magnification TEM image of the SiC nanofiber fabricated in Example 1.

Further, the SiC nanofiber fabricated by the second thermal treatment was observed by TEM in a low magnification and the result was shown in FIG. 14. As shown in FIG. 14, the SiC nanofiber had a diameter of about 200 nm and a single crystalline phase which is observed by the electron diffraction pattern. In FIG. 14, the arrow means the direction of crystal face [111].

Figure 15:
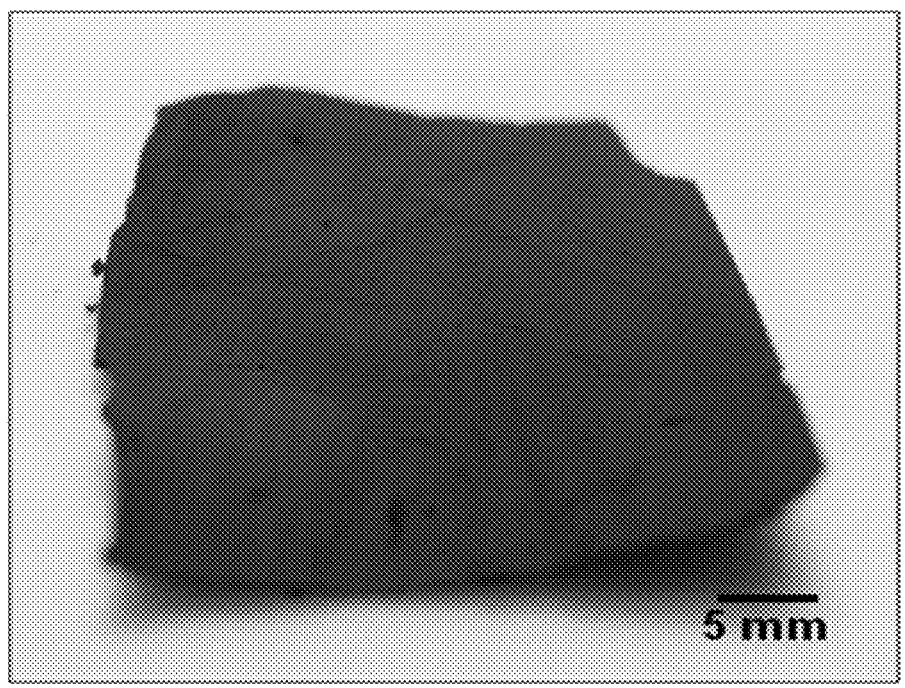
FIG. 15: a digital photography of the SiC nanofiber web fabricated in Example 1.

An SiC nanofiber web fabricated by using the second thermal treated SiC nanofibers observed by a digital camera and the result was shown in FIG. 15. As shown in FIG. 15, the fibers having an aspect ratio of 10 or more were connected with each other to form the SiC nanofiber web. Because the SiC nanofibers are fabricated by the thermal treatment of the composite nanofiber at a high temperature, the composite nanofibers also have an aspect ratio of 10 or more. This result also shows that an SiC nanofiber web may be fabricated on a commercial scale by the inventive method.

Example 2

Fabrication of SiC Nanofiber

The procedure of Example 1 was repeated except for using the PCS-toluene solution in an amount of 20% by weight based on the total amount of surfactant, polar solvent and aqueous polymer to fabricate the SiC nanofiber.

Figure 16:
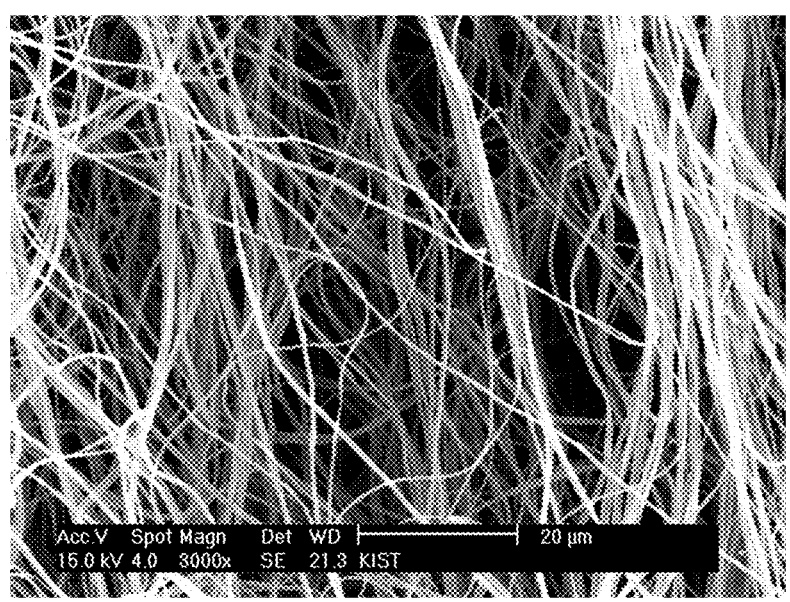
FIG. 16: a SEM image of the electrospun composite nanofiber in Example 2.

The composite nanofiber obtained by electrospinning was observed by SEM in accordance with the same method as in Example 1 and the result was shown in FIG. 16. As shown in FIG. 16, the overall diameter of the composite nanofiber was ranging from 400 to 900 nm.

Further, the fiber obtained by the first thermal treatment was observed by SEM and TEM. The results were shown in FIGS. 17 and 18 respectively.

Figure 17:
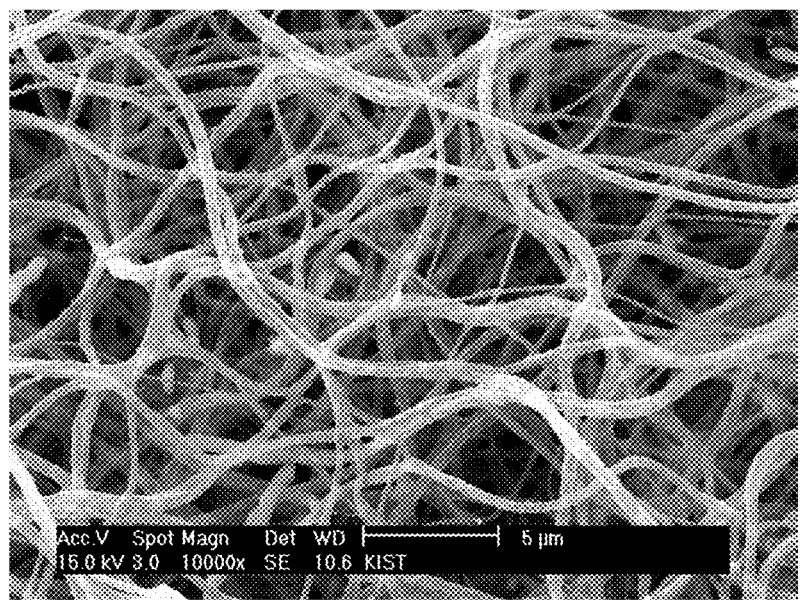
FIG. 17: a SEM image of the fibers obtained by first thermal treatment of the composite nanofibers in Example 2.

As shown in FIG. 17, the surface morphology and diameter of the composite nanofiber did not changed even after the first thermal treatment, when compared to FIG. 16.

Figure 18:
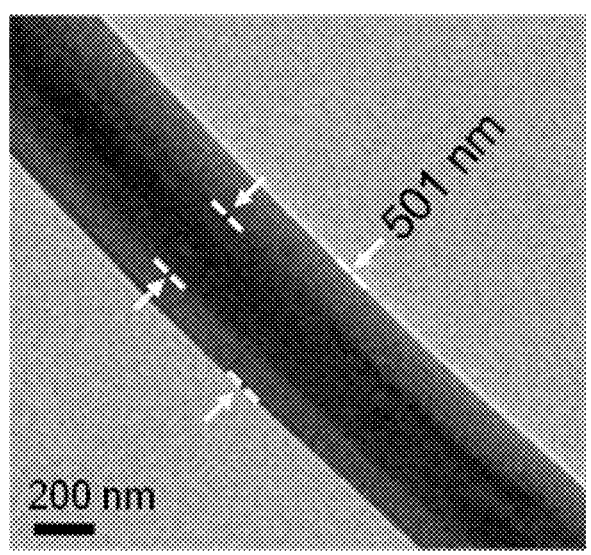
FIG. 18: a TEM image of the fibers obtained by first thermal treatment of the composite nanofibers in Example 2.

In FIG. 18, the dark parts correspond to the SiC precursor structure and the bright parts correspond to the polymer fiber. As shown in FIG. 18, the fiber obtained by the first thermal treatment had a core-shell structure in which the core is made of the aggregated PCS structures in the center of the fiber and the shell encasing the core is made of PVP. The diameter of the PCS structures was 253 nm and the diameter of the fiber including the PVP polymer shell was 501 nm.

Figure 19:
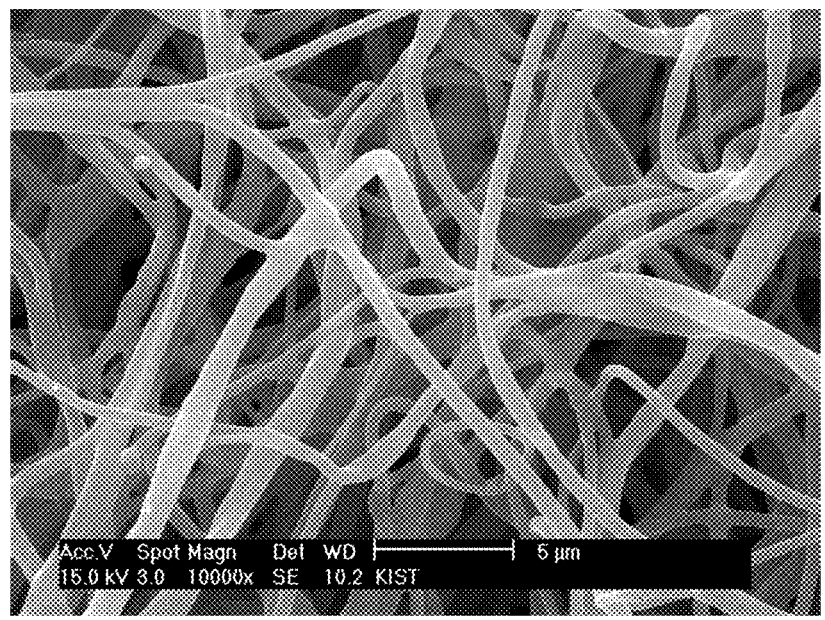
FIG. 19: a SEM image of the SiC nanofibers fabricated in Example 2.

The SiC nanofiber obtained by the second thermal treatment was observed by SEM in accordance with the same method as in Example 1 and the result was shown in FIG. 19. As shown in FIG. 19, the SiC nanofibers had a diameter ranging from 300 to 500 nm which is larger than that of the nanofibers obtained in Example 1.

Example 3

Fabrication of SiC Nanofiber

The procedure of Example 1 was repeated except for using the PCS-toluene solution in an amount of 30% by weight based on the total amount of surfactant, polar solvent and aqueous polymer to fabricate the SiC nanofiber.

Figure 20:
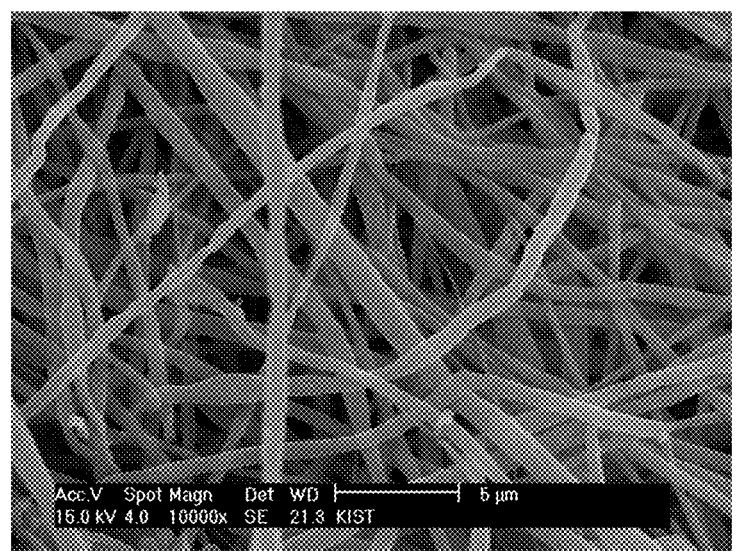
FIG. 20: a SEM image of the electrospun composite nanofibers in Example 3.

The composite nanofiber obtained by electrospinning of emulsion was observed by SEM in accordance with the same method as in Example 1 and the result was shown in FIG. 20. As shown in FIG. 20, the overall diameter of the composite nanofiber was ranging from 450 nm to 1.2 µm.

Further, the nanofiber obtained by the first thermal treatment was observed by SEM and TEM. The results were shown in FIGS. 21 and 22 respectively.

Figure 21:
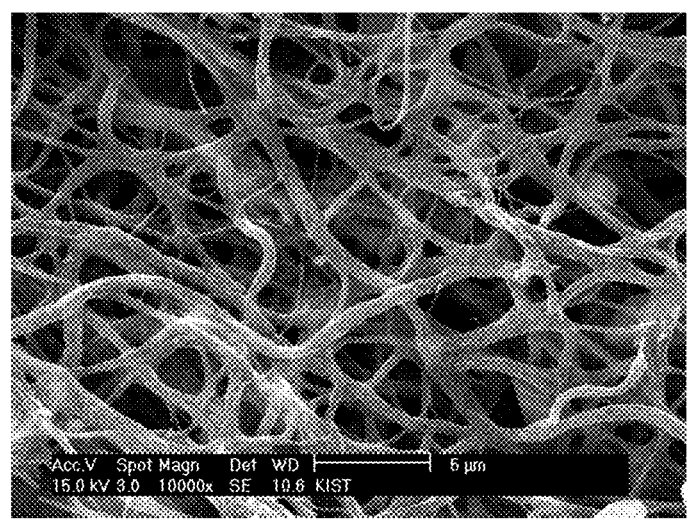
FIG. 21: a SEM image of the fibers obtained by first thermal treatment of the composite nanofibers in Example 3.

As shown in FIG. 21, the surface morphology and diameter of the composite nanofiber did not changed even after the first thermal treatment, when compared to FIG. 20.

Figure 22:
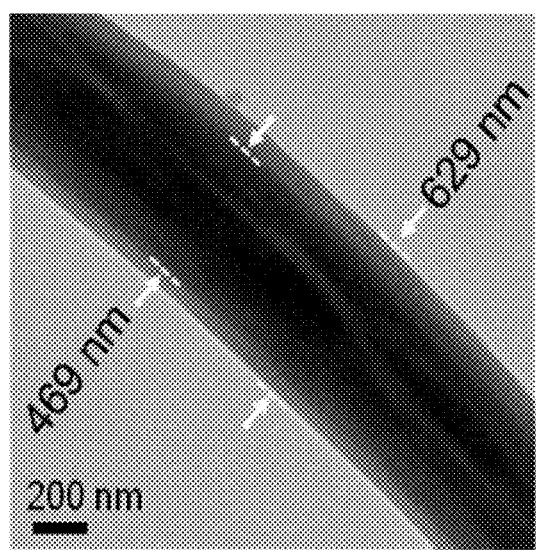
FIG. 22: a TEM image of the fibers obtained by first thermal treatment of the composite nanofibers in Example 3.

In FIG. 22, the dark parts correspond to the SiC precursor structure and the bright parts correspond to the polymer fiber. As shown in FIG. 22, the fiber obtained by the first thermal treatment had a core-shell structure in which the core is made of the aggregated PCS structures in the center of the fiber and the shell encasing the core is made of PVP. The diameter of the PCS structures was 469 nm and the diameter of the composite nanofiber including PVP polymer shell was 629 nm. The diameters of the PCS structures and the fibers were increased compared to Example 1. This result shows that the diameters of the fiber and PCS structures increase as the content of SiC precursor solution increase.

Figure 23:
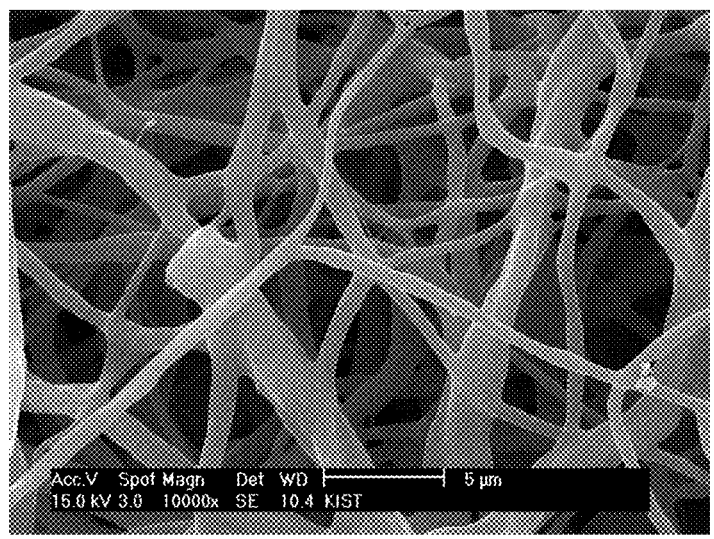
FIG. 23: a SEM image of the SiC nanofibers fabricated in Example 3.

The SiC nanofiber obtained by the second thermal treatment was observed by SEM in accordance with the same method as in Example 1 and the result was shown in FIG. 23. As shown in FIG. 23, the SiC nanofiber had a diameter ranging from 400 to 800 nm which is larger than that of the nanofiber obtained in Example 2.

Example 4

Fabrication of SiC Nanofiber

The procedure of Example 1 was repeated except for using the PCS-toluene solution in an amount of 40% by weight based on the total amount of surfactant, polar solvent and aqueous polymer to fabricate the SiC nanofiber.

Figure 24:
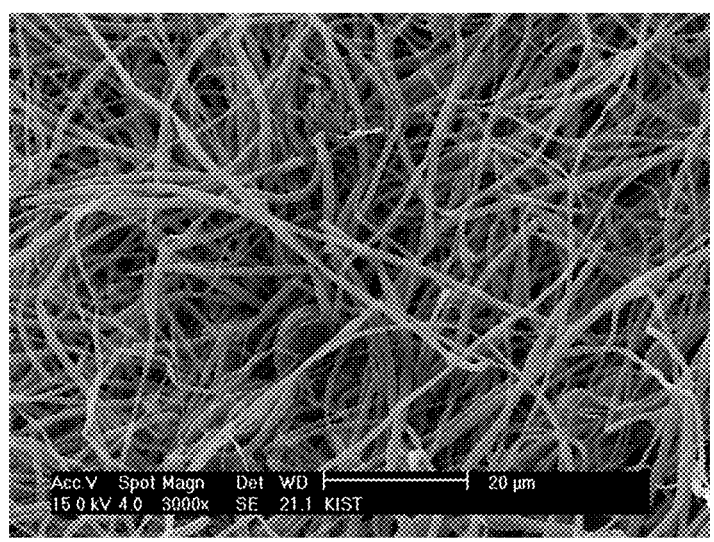
FIG. 24: a SEM image of the electrospun composite nanofibers in Example 4.

The composite nanofiber obtained by electrospinning of the emulsion was observed by SEM in accordance with the same method as in Example 1 and the result was shown in FIG. 24. As shown in FIG. 24, the diameter of the composite nanofiber was ranging from 500 nm to 1.5 µm.

Figure 25:
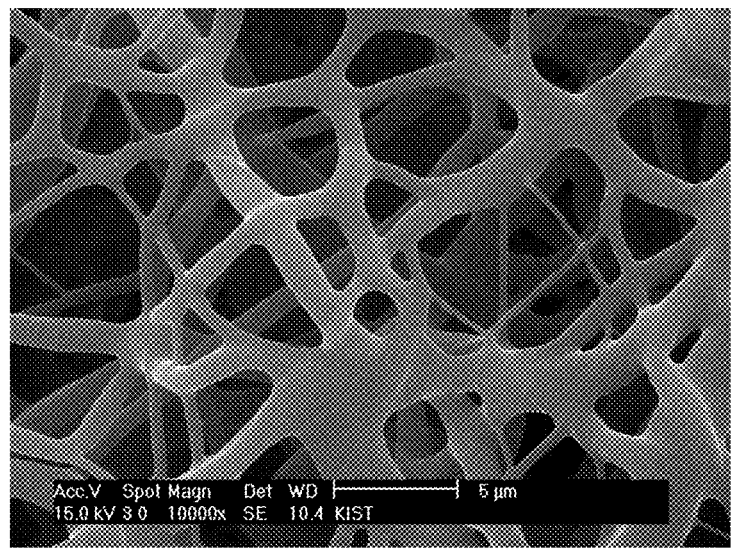
FIG. 25: a SEM image of the SiC nanofibers fabricated in Example 4.

Further, the SiC nanofiber obtained by the second thermal treatment was observed by SEM. The results were shown in FIG. 25. As shown in FIG. 25, the SiC nanofiber has a diameter of 1 µm which is larger than that of the nanofiber obtained in Example 3.

Comparative Example 4

Fabrication of SiC Nanofiber Using Conventional Electrospinning 5 g of polycarbosilane (PCS, Mw: 2,500 g/mol) was completely dissolved in a mixture of 2 ml of toluene and 1 ml of dimethylformamide to prepare a spinning solution.

Then, the obtained spinning solution was loaded in an amount of 20 ml into a syringe pump and subjected to an electrospinning at a rate of 10 µl/min (humidity: 20%, available voltage: 27.0 kV, temperature: 28° C.) to prepare polycarbosilane fibers.

Figure 26:
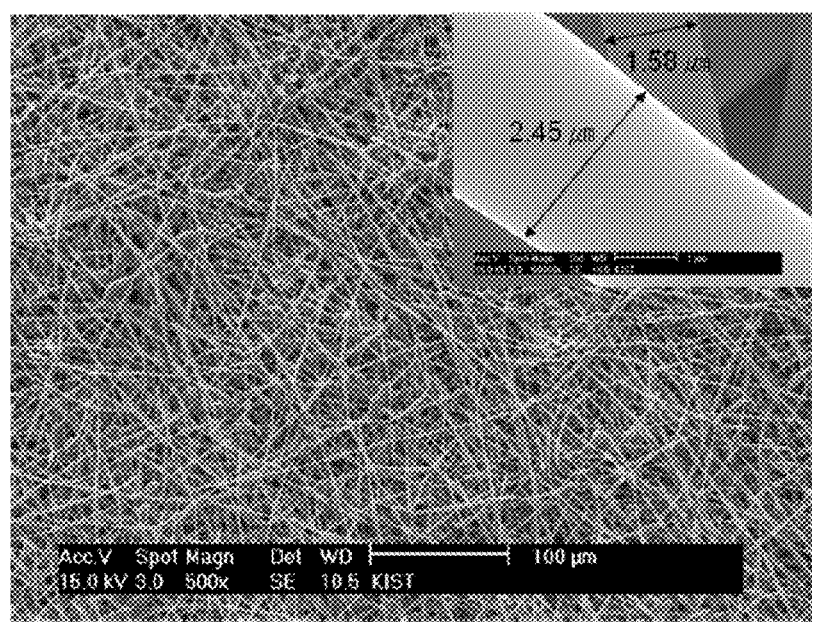
FIG. 26: a SEM image of the polycarbosilane fibers fabricated in Comparative Example 1.

The obtained polycarbosilane fibers were observed by SEM and the result was shown in FIG. 26. As shown in FIG. 26, the polycarbosilane fibers have a diameter ranging from 1.5 to 3 µm and showed non-uniform distribution of the diameter.

The obtained SiC fibers were subjected to a thermal treatment at 1600° C. to form SiC fibers and the fabricated SiC fibers were observed by SEM. As a result, the obtained SiC fiber had a micrometer scale diameter ranging from 1.2 to 2.5 µm.

As shown in the above, a single crystalline SiC nanofiber, which could not be fabricated by a conventional method, can be fabricated by the inventive method. Further, the SiC nanofiber fabricated by the present invention has improved thermal and mechanical stability as well as a large specific surface area, which is applicable to a system for purifying exhaust gas, SiC fiber filter, diesel particulate filter which require a high temperature stability. The inventive SiC nanofibers may be also used in the form of nanostructures such as nanorods and nanoparticles.

While the invention has been described with respect to the above specific embodiments, it should be recognized that various modifications and changes may be made to the invention by those skilled in the art which also fall within the scope of the invention as defined by the appended claims.

What is claimed is:
1. A method for preparing the single crystalline silicon carbide nanofiber, comprising the steps of:
    preparing an oil in water emulsion by mixing a silicon carbide precursor solution in a non-polar solvent with a surfactant, a polar solvent, and an aqueous polymer;
    subjecting the oil in water emulsion to spinning to prepare a composite nanofiber which comprises an aqueous polymer matrix and at least one silicon carbide precursor structure dispersed in the aqueous polymer matrix; and
    thermally treating the composite nanofiber.
2. The method for preparing the single crystalline silicon carbide nanofiber of claim 1, wherein the silicon carbide precursor is selected from the group consisting of polycarbosilane, polycarbomethylsilane, polysilazane, polysilane, organopolysiloxane, and a mixture thereof.
3. The method for preparing the single crystalline silicon carbide nanofiber of claim 1, wherein the non-polar solvent is selected from the group consisting of toluene, benzene, hexane, pentane, chloroform, and a mixture thereof.
4. The method for preparing the single crystalline silicon carbide nanofiber of claim 1, wherein the surfactant is selected from the group consisting of anionic surfactant, cationic surfactant, nonionic surfactant, ampholytic surfactant and a mixture thereof.
5. The method for preparing the single crystalline silicon carbide nanofiber of claim 1, wherein the polar solvent is selected from the group consisting of water, ethanol, dimethylformamide, N-methylpyrrolidone, dimethylacetamide, and a mixture thereof.

6. The method for preparing the single crystalline silicon carbide nanofiber of claim 1, wherein the aqueous polymer is selected from the group consisting of polyurethane, polyurethane copolymer, cellulose derivatives, polymethylmethacrylate, polymethylacrylate, polyacryl copolymer, polyvinylacetate, polyvinylacetate copolymer, polyvinylalcohol, polyfurfurylalcohol, polyvinylpyrrolidone, polystyrene, polystyrene copolymer, polyethylene oxide, polypropylene oxide, polyethylene oxide copolymer, polypropylene oxide copolymer, polycarbonate, polyvinylchloride, polycaprolactone, polyvinyl fluoride, polyvinylidene fluoride copolymer, polyamide, polyether imide, and a mixture thereof.

7. The method for preparing the single crystalline silicon carbide nanofiber of claim 1, wherein the silicon carbide precursor solution is used in an amount of 10 to 50% by weight based on the total weight of the surfactant, polar solvent and non-polar solvent.

8. The method for preparing the single crystalline silicon carbide nanofiber of claim 1, wherein the oil in water emulsion comprises the aqueous polymer-containing solution prepared by dissolving the aqueous polymer in the polar solvent, and the silicon carbide precursor solution in the form of micelles which are encased by the surfactant and dispersed in the aqueous polymer-containing solution.

9. The method for preparing the single crystalline silicon carbide nanofiber of claim 1, wherein the silicon carbide precursor structure has a shape selected from the group consisting of spherical, elliptical and cylindrical shape.

10. The method for preparing the single crystalline silicon carbide nanofiber of claim 9, wherein the silicon carbide precursor structure has a shape selected from the group consisting of a spherical shape having an average diameter ranging from 20 nm to 50 nm; an elliptical shape having an aspect ratio of 1.1 to 5 and a minor axis length of 50 nm to 250 nm; and a cylindrical shape having an aspect ratio of 5 to 20 and a minor axis length of 50 nm to 500 nm.

11. The method for preparing the single crystalline silicon carbide nanofiber of claim 1, wherein the thermal treatment comprises the steps of:
  conducting a first thermal treatment by heating the composite nanofiber at 150 to 230° C. in the air or under an oxygen atmosphere, and
  conducting a second thermal treatment by heating the fiber obtained from the first thermal treatment at 1200 to 2500° C. in a vacuum or under an inert atmosphere.

* * * * *